(12) United States Patent
Rubalcava et al.

(10) Patent No.: US 12,546,309 B2
(45) Date of Patent: Feb. 10, 2026

(54) STEMMED ORIFICE COMPONENT

(71) Applicant: SPM Oil & Gas Inc., Fort Worth, TX (US)

(72) Inventors: Albert Rubalcava, Lake Worth, TX (US); Jeffrey Haiderer, Fort Worth, TX (US); John S. Marquez, Saginaw, TX (US); Chandu Kumar, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 18/751,100

(22) Filed: Jun. 21, 2024

(65) Prior Publication Data

US 2025/0389270 A1  Dec. 25, 2025

(51) Int. Cl.
    *F04B 53/18*     (2006.01)
    *F04B 53/00*     (2006.01)
    *F16N 21/04*     (2006.01)
    *F16N 25/00*     (2006.01)

(52) U.S. Cl.
    CPC ............ *F04B 53/18* (2013.01); *F04B 53/006* (2013.01); *F16N 21/04* (2013.01); *F16N 25/00* (2013.01); *F16N 2210/16* (2013.01)

(58) Field of Classification Search
    CPC ......... F04B 53/006; F04B 53/18; F16N 21/04
    See application file for complete search history.

(56) References Cited

U.S. PATENT DOCUMENTS

| | | | |
|---|---|---|---|
| 3,785,459 A | 1/1974 | Patchen | |
| 5,511,523 A | 4/1996 | Masuda | |
| 7,264,086 B2 | 9/2007 | Ito et al. | |
| 8,312,858 B2 | 11/2012 | Mcclave et al. | |
| 2007/0023548 A1 | 2/2007 | Hajjar | |
| 2015/0369082 A1* | 12/2015 | Schwarz | F01D 25/20 415/177 |
| 2016/0177945 A1* | 6/2016 | Byrne | F04B 1/0404 184/6 |
| 2017/0350275 A1* | 12/2017 | Von Berg | B05B 15/65 |

FOREIGN PATENT DOCUMENTS

| | | |
|---|---|---|
| CN | 203441560 U | 2/2014 |
| GB | 2479005 A | 9/2011 |
| JP | 2009085197 A * | 4/2009 |
| JP | 4775354 B2 | 9/2011 |
| JP | 4941215 B2 | 5/2012 |
| JP | 2013087904 A | 5/2013 |

* cited by examiner

*Primary Examiner* — Thomas E Lazo

(57) ABSTRACT

An orifice component for a lubrication system may include an orifice head having an outlet orifice and one or more inlet passageways in fluid communication with the outlet orifice. The orifice component may include an orifice stem extending from the orifice head. The orifice stem may have a solid structure.

20 Claims, 7 Drawing Sheets

STEMMED ORIFICE COMPONENT

TECHNICAL FIELD

The present disclosure relates generally to fluid pumps and, for example, to a stemmed orifice component.

BACKGROUND

Hydraulic fracturing is a well stimulation technique that typically involves injecting fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids. The injected fluid may be pressurized by a fluid pump. The fluid pump may be, for example, a reciprocating pump that includes a power end and a fluid end. The power end converts rotational energy/motion into reciprocating energy/motion via a crankshaft.

The crankshaft may rotate within a bearing structure that includes a set of roller bearings between bearing races. The roller bearings may be lubricated via a lubrication channel that includes an orifice configured to control a rate of flow of lubrication fluid to the roller bearings. During assembly of the power end, the orifice may be installed into an end of the lubrication channel. Subsequent installation of the bearing races, roller bearings, and crankshaft may cover the lubrication channel and the orifice, thereby making the orifice difficult to access. Accordingly, if a lubrication issue arises, servicing or replacement of the orifice involves uninstalling the crankshaft, roller bearings, and bearing races, and removal of the orifice by drilling it out from the lubrication channel. This process is time consuming and results in significant downtime of the power end.

The stemmed orifice component of the present disclosure solves one or more of the problems set forth above and/or other problems in the art.

SUMMARY

A power end of a fluid pump may include a power end frame having a nose plate, a crankshaft and one or more bearings for the crankshaft connected at an interior of the power end frame, and a lubrication manifold defined in the power end frame. The lubrication manifold may include a main lubrication channel and a branch lubrication channel that branches from the main lubrication channel. The branch lubrication channel may have a first end that opens through the nose plate and a second end in fluid communication with the one or more bearings. The power end may include an orifice component disposed in the branch lubrication channel. The orifice component may include an orifice head having an outlet orifice and one or more inlet passageways in fluid communication with the outlet orifice, and an orifice stem extending from the orifice head toward the first end of the branch lubrication channel.

A lubrication system may include a lubrication manifold including a main lubrication channel and a branch lubrication channel that branches from the main lubrication channel. The lubrication system may include an orifice component disposed in the branch lubrication channel. The orifice component may include an orifice head having an outlet orifice and one or more inlet passageways in fluid communication with the outlet orifice, and an orifice stem extending from the orifice head.

An orifice component for a lubrication system may include an orifice head having an outlet orifice and one or more inlet passageways in fluid communication with the outlet orifice. The orifice component may include an orifice stem extending from the orifice head. The orifice stem may have a solid structure.

DETAILED DESCRIPTION

This disclosure relates to a stemmed orifice component, which is applicable to any machine that includes a lubrication system.

Figure 1:
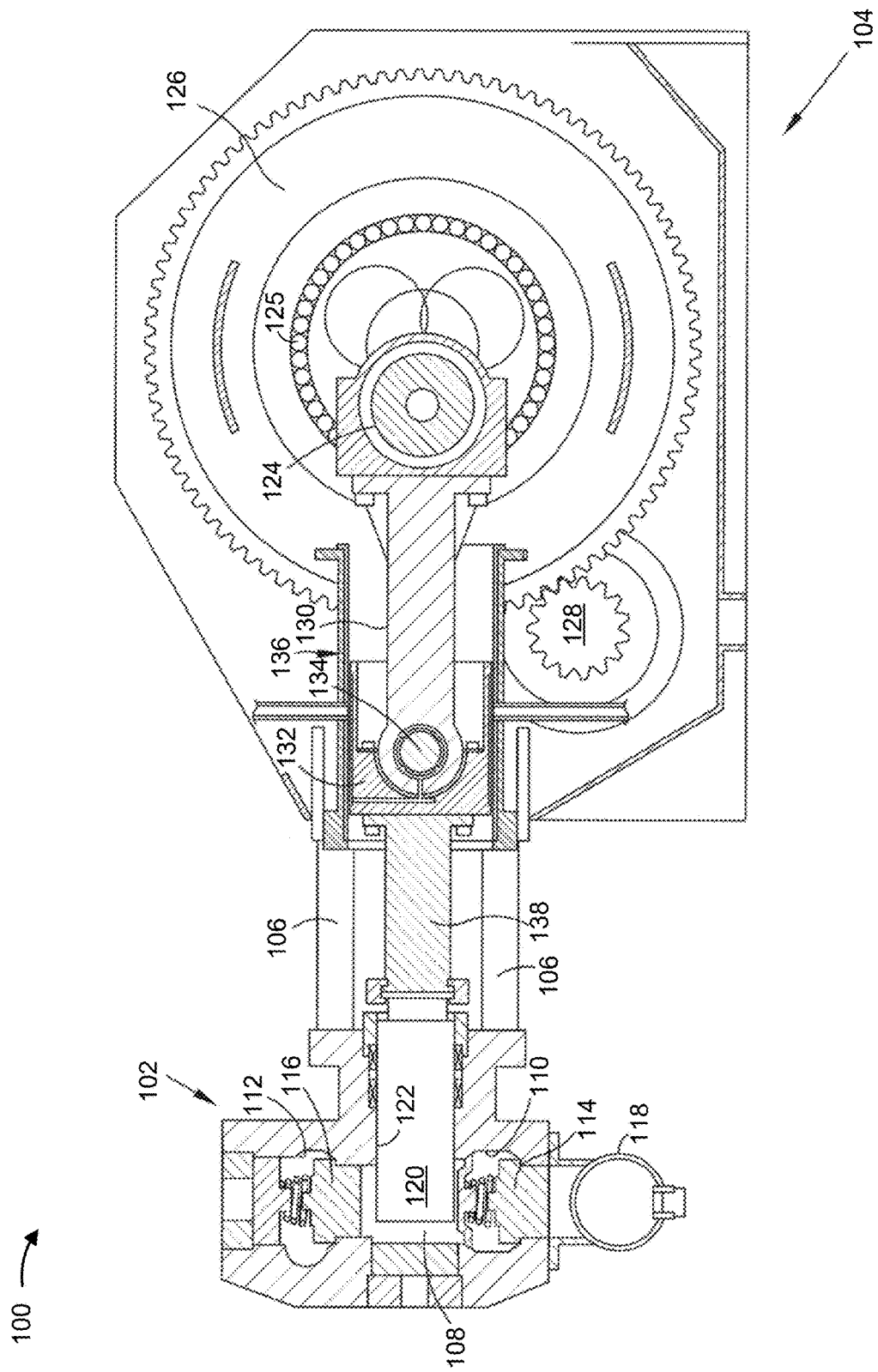
FIG. 1 shows a cross-sectional view of an example fluid pump.

FIG. 1 shows a sectional view of an example fluid pump 100. The fluid pump 100 includes a fluid end 102 and a power end 104. The fluid end 102 may be connected to the power end 104 by stay rods 106. The fluid end 102 includes one or more fluid chambers 108 (only one shown). For example, the fluid end 102 may include one, two, three, four, five, or more fluid chambers 108. In some implementations, the fluid pump 100 may be mounted on a trailer to facilitate transportation of the fluid pump 100 between operational sites. In some implementations, the fluid pump 100 may be a hydraulic fracturing pump. For example, the fluid pump 100 may have a capability to produce a discharge pressure of at least 8,000 psi, at least 10,000 psi, at least 12,000 psi, or at least 15,000 psi.

The fluid pump 100 includes a suction valve 114, disposed within a suction bore 110, that is configured to control fluid suction into the fluid chamber 108. Similarly, the fluid pump 100 includes a discharge valve 116, disposed within a discharge bore 112, that is configured to control fluid discharge from the fluid chamber 108. In operation, fluid is pressurized to a low pressure (e.g., 80 psi) by an outside system (e.g., a centrifugal pump) and pushed through a suction manifold 118 through the suction valve 114 and into the fluid chamber 108. The fluid is then pumped in response to a forward stroke of a plunger 120 and flows through the discharge valve 116.

In operation, the plunger 120 moves in a plunger bore 122 and is driven by the power end 104 of the fluid pump 100. The power end 104 includes a crankshaft 124 that is rotated, within a bearing assembly 125, by a gearbox output 126, which is illustrated by a single gear but may be more than one gear. A gearbox input 128 is coupled to a transmission (not shown) and/or a prime mover (not shown), such as a diesel engine, to rotate the gearbox input 128 during operation. A connecting rod 130 mechanically connects the crankshaft 124 to a crosshead 132 via a wrist pin 134. The crosshead 132 is mounted within a stationary crosshead housing 136, which constrains the crosshead 132 to linear reciprocating movement. A pony rod 138 connects to the crosshead 132 and has its opposite end connected to the plunger 120 to enable reciprocating movement of the plunger 120. In operation, movement of the crankshaft 124 causes the plunger 120 to reciprocate with respect to the fluid chamber 108 (e.g., to reciprocate toward and away from the fluid chamber 108).

As indicated above, FIG. 1 is provided as an example. Other examples may differ from what is described with regard to FIG. 1.

Figure 2:
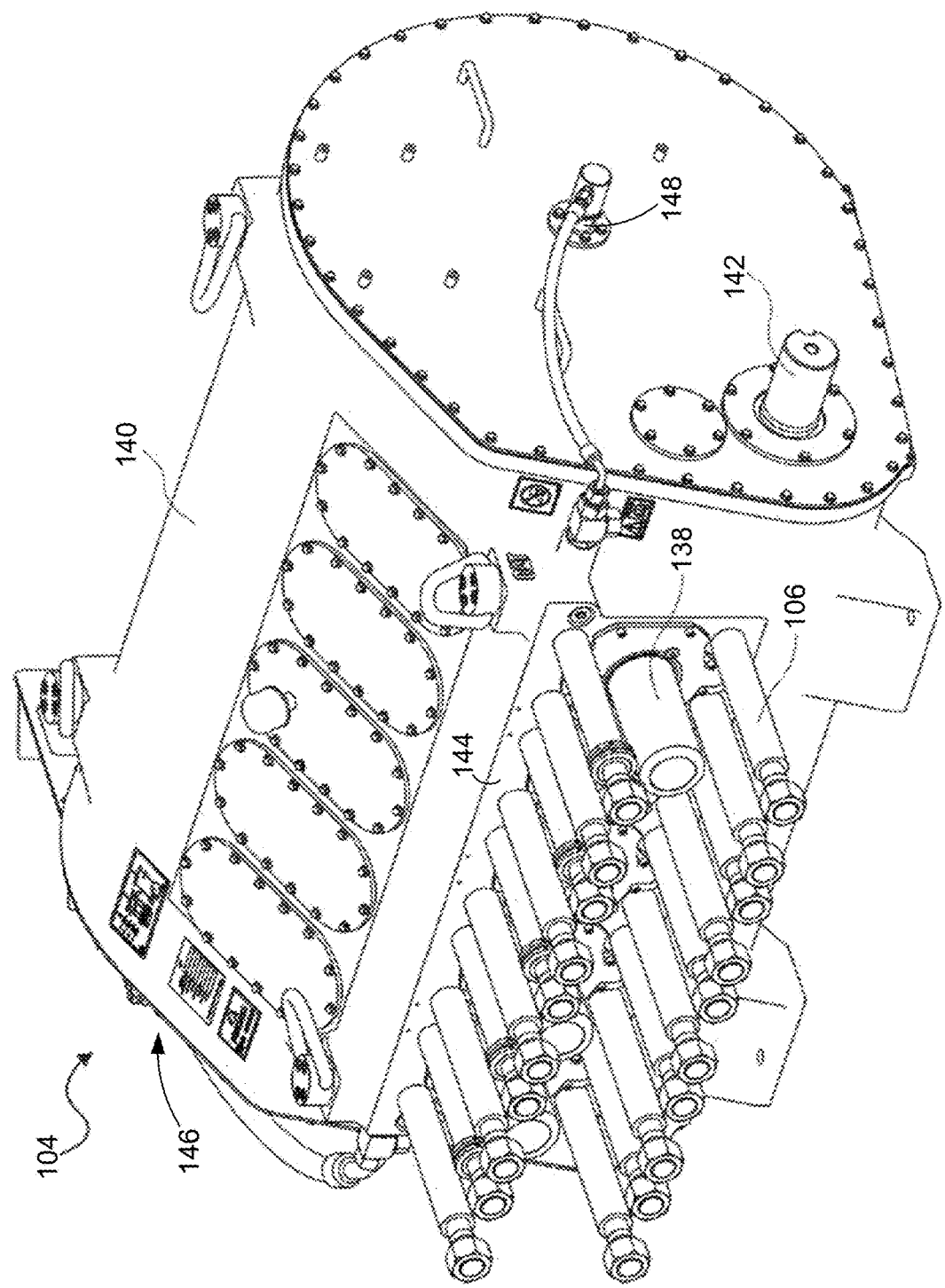
FIG. 2 shows a perspective view of a power end.
Figure 3:
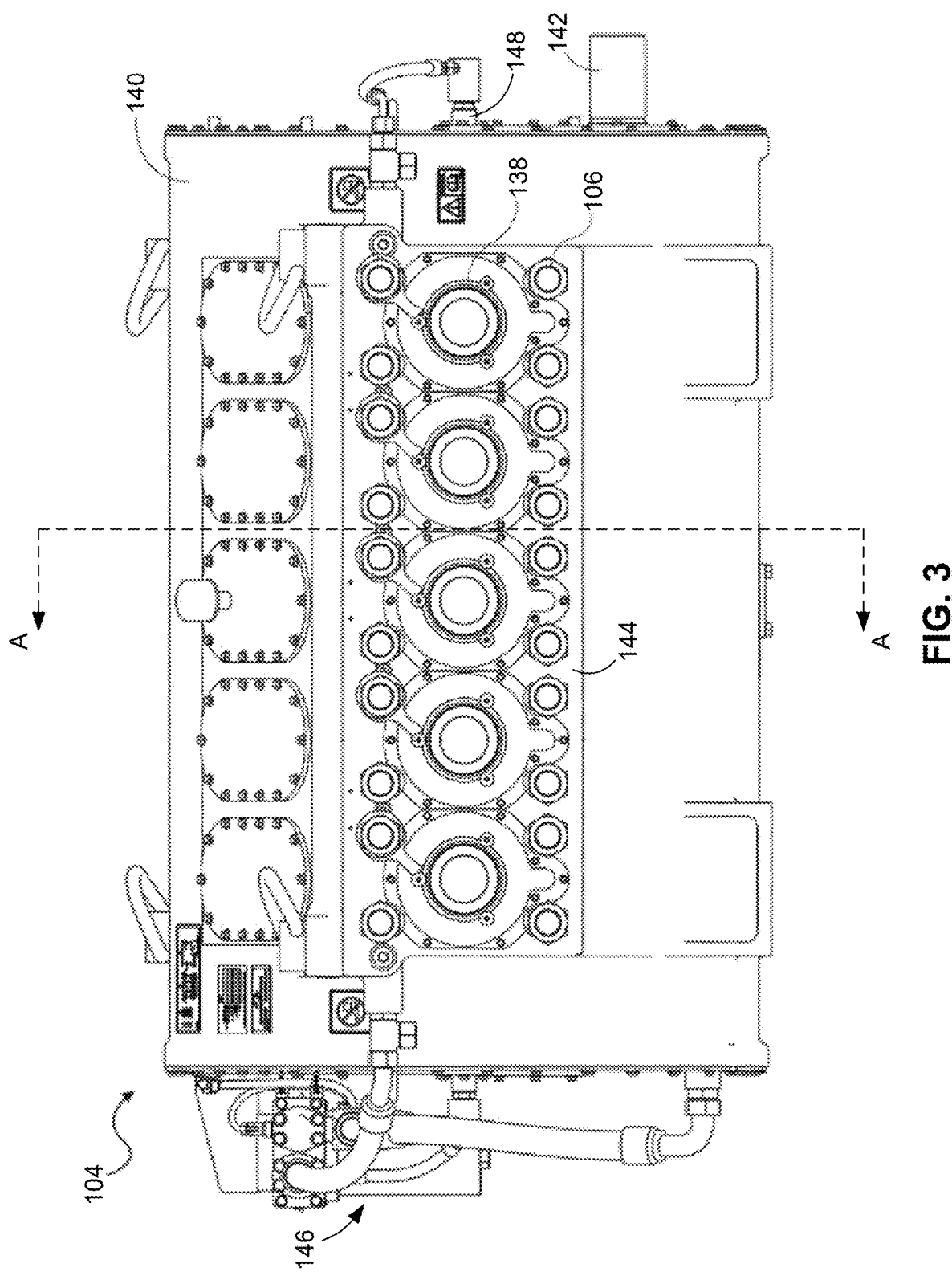
FIG. 3 shows a front view of a power end.

FIG. 2 shows a perspective view of the power end 104, and FIG. 3 shows a front view of the power end 104. The power end 104 may include a power end frame 140. The power end frame 140 may be made of cast metal (e.g., ductile iron, gray iron, cast steel, or the like). The power end frame 140 may have a single-piece construction (e.g., a single cast part) or a multiple-piece construction (e.g., multiple cast plates that are welded together).

The power end 104 may also include an input drive shaft 142 (also referred to as a pinion). The input drive shaft 142 may extend through the power end frame 140 (e.g., from an exterior of the power end frame 140 to an interior of the power end frame 140). The input drive shaft 142 may couple the gearbox input 128 to a prime mover (not shown) and/or a transmission (not shown), which may cause the input drive shaft 142 to rotate thereby rotating the gearbox input 128.

As shown, the pony rods 138 may extend from inside the power end frame 140 through a nose plate 144 of the power end frame 140. The power end 104 may convert the rotational motion of the input drive shaft 142 to reciprocating (e.g., linear) motion of the pony rods 138 via the crankshaft 124. As shown, the stay rods 106 may also extend from inside the power end frame 140 through the nose plate 144.

The power end 104 may include a lubrication system 146. The lubrication system 146 may be configured to circulate (e.g., via an oil pump) a lubrication fluid (e.g., oil) through a lubrication manifold 148 defined in the power end frame 140. The lubrication manifold 148 may be configured to direct the lubrication fluid to components inside the power end frame 140, as described herein.

As indicated above, FIGS. 2-3 are provided as an example. Other examples may differ from what is described with regard to FIGS. 2-3.

Figure 4:
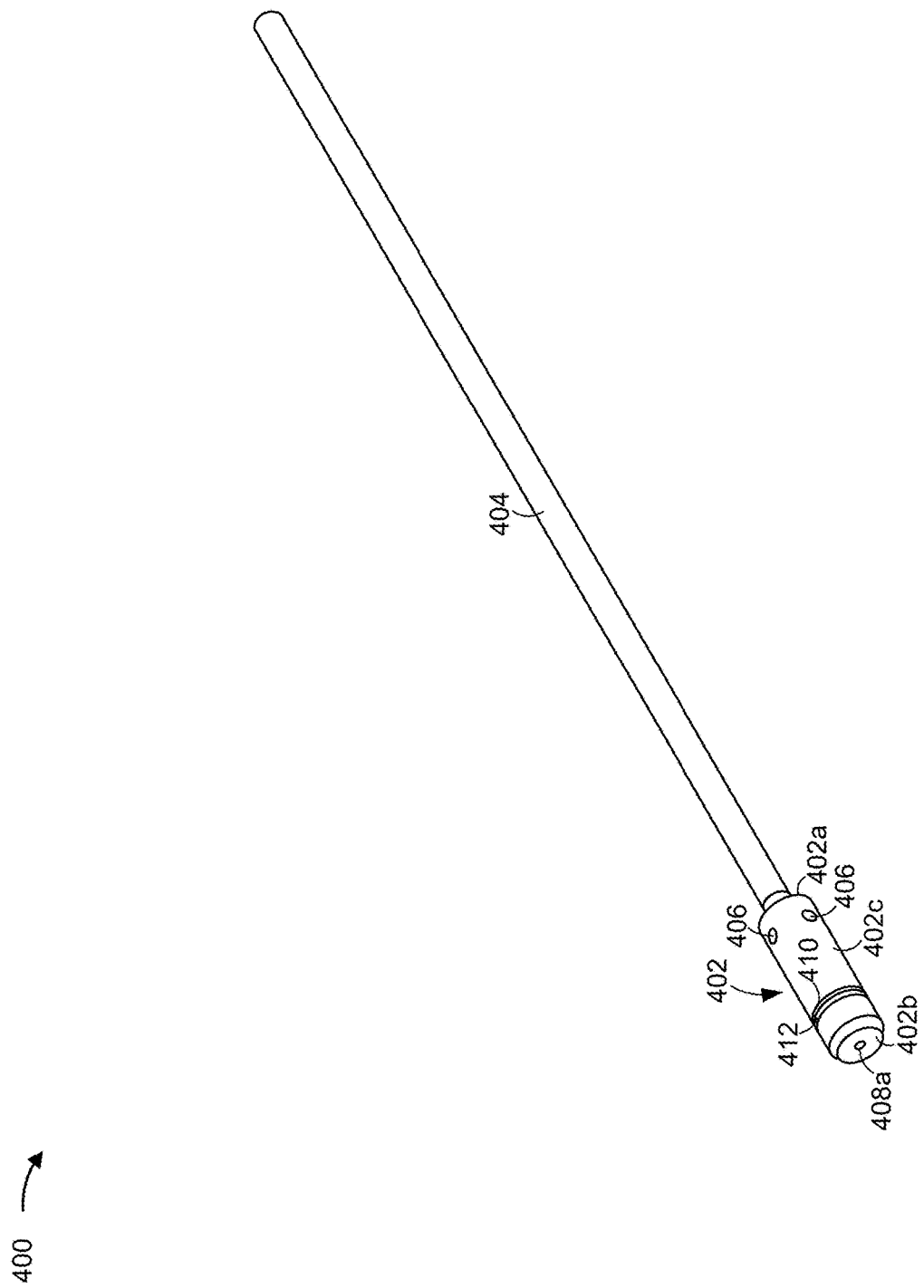
FIG. 4 shows a perspective view of an example orifice component.
Figure 5:
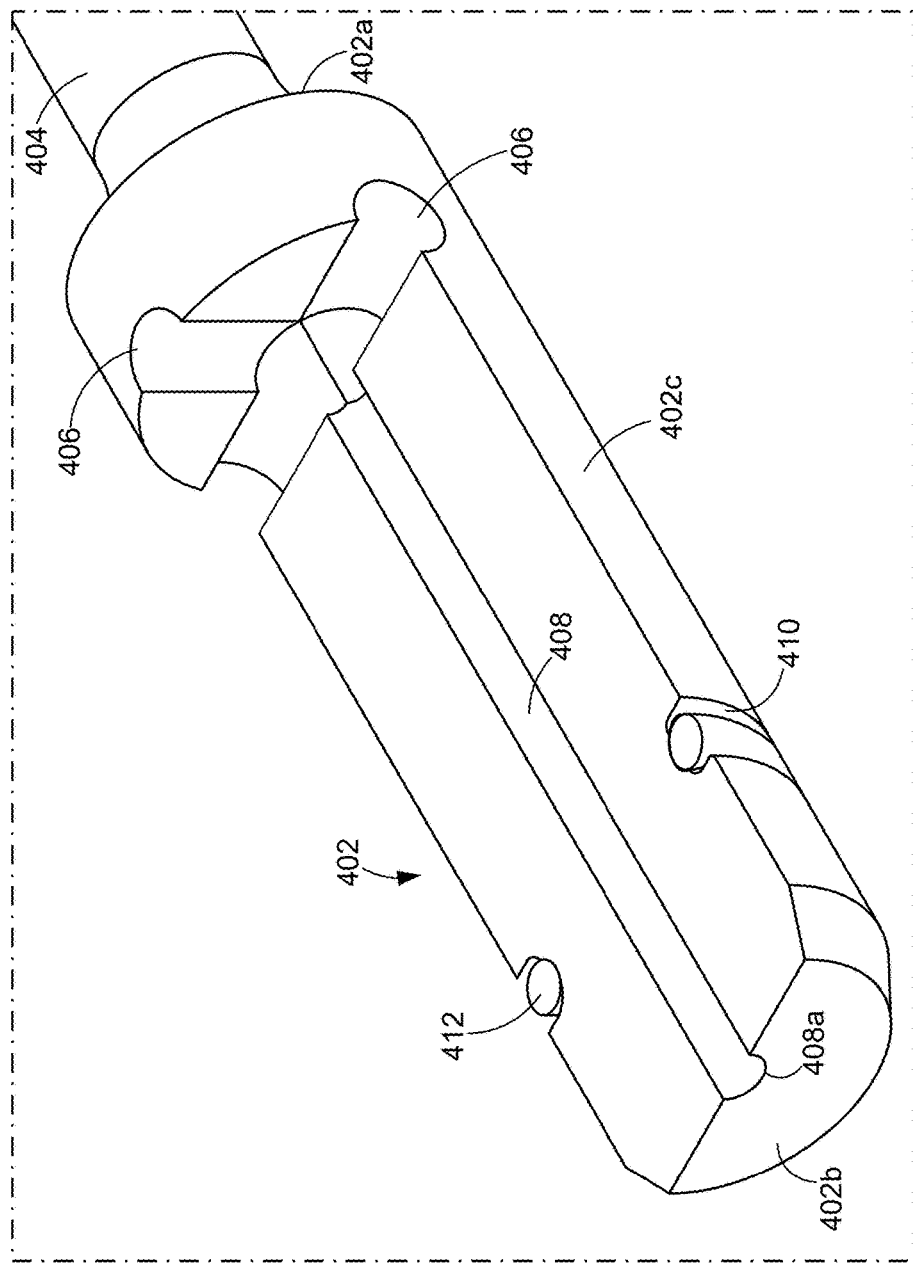
FIG. 5 shows a partial cross-sectional view of an example orifice component.

FIG. 4 shows a perspective view of an example orifice component 400, and FIG. 5 shows a partial sectional view of the orifice component 400. The orifice component 400 includes an orifice head 402 and an orifice stem 404 extending from the orifice head 402. The orifice head 402 and the orifice stem 404 may have a single-piece construction, or may be separate pieces that are attached by welds or are threaded together, among other examples.

The orifice head 402 has a first end 402a, a second end 402b opposite the first end 402a, and a sidewall 402c that extends between the first end 402a and the second end 402b. The orifice head 402 may have an overall cylindrical shape that is sized to fit within a lubrication passageway of the lubrication system 146, as described in connection with FIG. 6. The orifice head 402 may include one or more inlet passageways 406 in fluid communication with an outlet orifice 408. In operation, lubrication fluid pumped by the lubrication system 146 may enter the orifice head 402 through the inlet passageways 406, and may exit the orifice head 402 through the outlet orifice 408. A diameter of the outlet orifice 408 may dictate a flow rate of the lubrication fluid through the orifice head 402.

The orifice stem 404 may extend from the first end 402a of the orifice head 402, and an outlet 408a of the outlet orifice 408 may be at the second end 402b of the orifice head 402. The inlet passageways 406 may be through the sidewall 402c of the orifice head 402. For example, the inlet passageways 406 may intersect the outlet orifice 408 (e.g., the inlet passageways 406 may be perpendicular to the outlet orifice 408). In some implementations, the inlet passageways 406 may include a first inlet passageway 406 extending through the orifice head 402, and a second inlet passageway 406 extending through the orifice head 402 and intersecting (e.g., perpendicularly) the first inlet passageways 406 (e.g., cross-drilled passageways). The use of two intersecting inlet passageways 406 is provided as an example, and other examples may employ three intersecting inlet passageways 406, four intersecting inlet passageways 406, or the like. In some implementations, an inlet passageway 406 may extend partially through the orifice head 402 only to the outlet orifice 408, rather than extending entirely through the orifice head 402. Here, other configurations of inlet passageways 406 may be employed, such as three converging inlet passageways 406 (e.g., in a spoked arrangement), five converging inlet passageways 406, or the like. Arranging multiple inlet passageways 406 circumferentially around the orifice head 402 allows for the orifice component 400 to be inserted into a lubrication passageway of the lubrication system 146 without regard to a particular orientation.

The orifice head 402 may have a circumferential groove 410 (e.g., that encircles the orifice head 402) and a sealing ring 412 (e.g., an O-ring) disposed in the circumferential groove 410. The circumferential groove 410 and the sealing ring 412 may be located in the orifice head 402 between the inlet passageways 406 and the outlet 408a of the outlet orifice 408. Thus, when the orifice component 400 is disposed within a lubrication passageway of the lubrication system 146, the sealing ring 412 facilitates fluid isolation between the inlet passageways 406 and the outlet 408a of the outlet orifice 408 from an exterior of the orifice head 402.

The orifice stem 404 may have a solid structure (e.g., a homogenous and continuous material composition throughout a length of the orifice stem 404). For example, fluid passageways may be absent from the orifice stem 404. In particular, the orifice stem 404 may not be involved in the circulation of lubrication fluid through the orifice component 400. The orifice stem 404 is elongated relative to the orifice head 402. In some implementations, a length of the orifice stem 404 may be at least four times or at least five times a length of the orifice head 402. The orifice head 402 and the orifice stem 404 may have the same diameter or different diameters (e.g., a diameter of the orifice stem 404 may be less than a diameter of the orifice head 402, as shown). In some implementations, an end section of the orifice stem 404 (e.g., opposite to where the orifice stem 404 connects to the orifice head 402) may be threaded, which facilitates engagement of the orifice stem 404 with a tool used for insertion or removal of the orifice component 400.

As indicated above, FIGS. 4-5 are provided as an example. Other examples may differ from what is described with regard to FIGS. 4-5.

Figure 6:
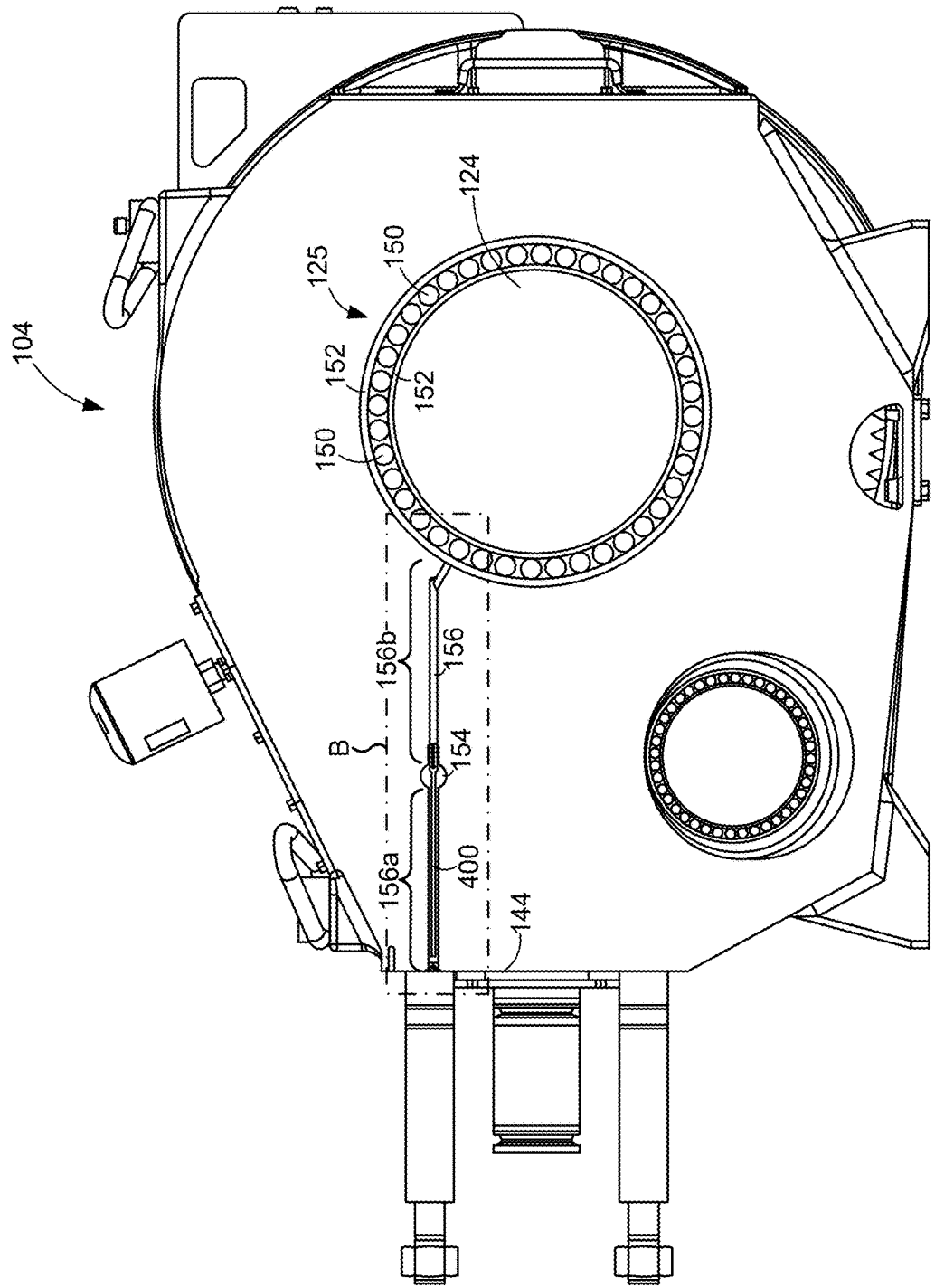
FIG. 6 shows a cross-sectional view of a power end taken along line A-A of FIG. 3.
Figure 7:
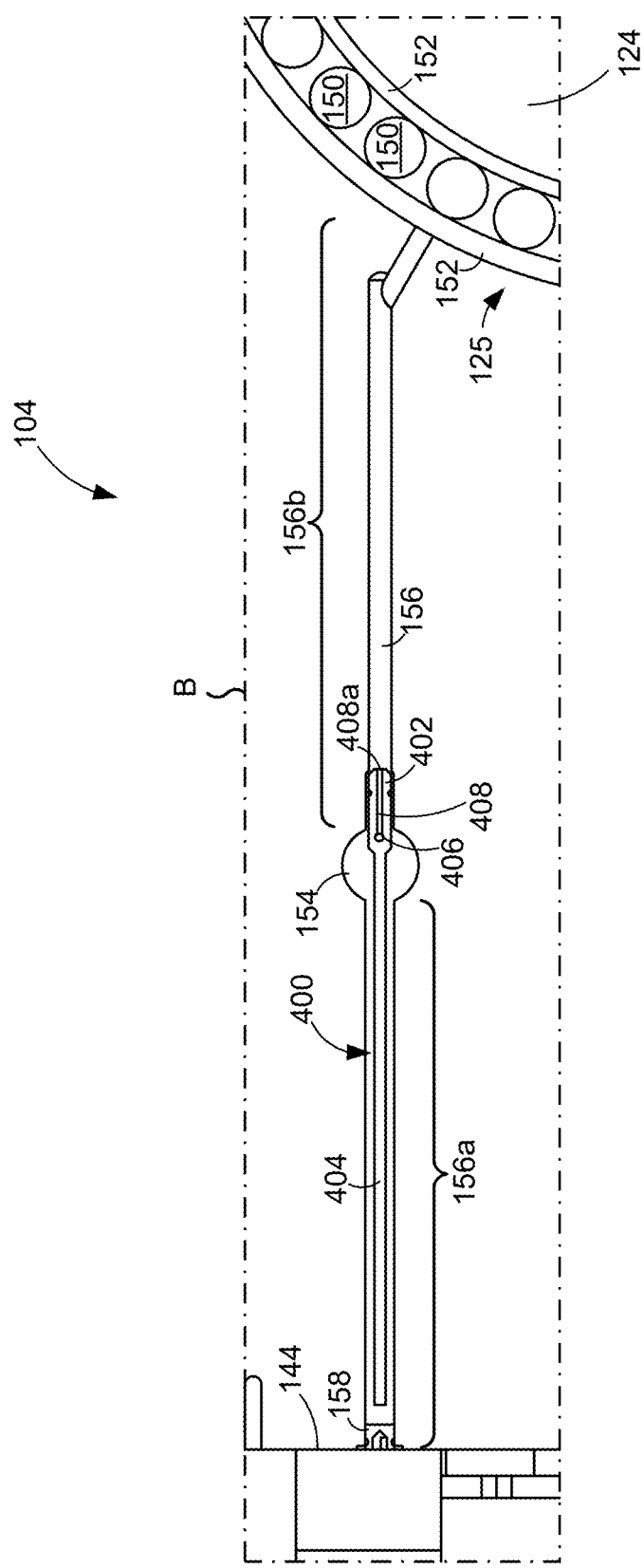
FIG. 7 shows an enlarged view of a portion of a power end.

FIG. 6 shows a cross-sectional view of the power end 104 taken along line A-A of FIG. 3, and FIG. 7 shows an enlarged view of a portion of the power end 104. As shown, the bearing assembly 125, which includes a plurality of bearings 150 disposed between bearing races 152, is connected to an interior of the power end frame 140. The crankshaft 124, which is connected at an interior of the power end frame 140, may be operable coupled to the bearing assembly 125.

As further shown, the lubrication manifold 148 may include a main lubrication channel 154 (e.g., that extends across a width of the power end 104) and at least one branch lubrication channel 156 that branches from the main lubrication channel 154. For example, the power end 104 may include a plurality of bearing assemblies 125 for the crankshaft 124, and the lubrication manifold 148 may include a respective branch lubrication channel 156 extending toward each bearing assembly 125.

The branch lubrication channel 156 may have a first end that opens through the nose plate 144, and a second end in fluid communication with the bearing assembly 125 (e.g., with one or more bearings 150). The branch lubrication channel 156 may intersect the main lubrication channel 154 to define a first section 156a of the branch lubrication channel 156 between the first end and the main lubrication channel 154, and a second section 156b of the branch lubrication channel 156 between the main lubrication channel 154 and the second end.

The orifice component 400 may be disposed in the branch lubrication channel 156. For example, the orifice component 400 may be inserted into the branch lubrication channel 156 from the first end of the branch lubrication channel 156 via the nose plate 144 (e.g., using a tool attached to the threaded end section of the orifice stem 404). Similarly, the orifice component 400 may be removed from the branch lubrication channel 156 (e.g., without removal of the crankshaft 124 or the bearing assembly 125) from the first end of the branch lubrication channel 156 via the nose plate 144 (e.g., using a tool attached to the threaded end section of the orifice stem 404). The elongated orifice stem 404 facilitates the insertion and removal of the orifice component 400 through the nose plate 144. In some implementations, the second end 402b of the orifice head 402 may have a chamfer (shown in FIGS. 4, 5) to facilitate guiding and aligning of the orifice component 400 as it is inserted through the branch lubrication channel 156.

When the orifice component 400 is positioned in the branch lubrication channel 156, the orifice head 402 may be positioned nearer to the second opening than to the first opening of the branch lubrication channel 156, and the orifice stem 404 may extend from the orifice head 402 toward the first end of the branch lubrication channel 156, such that an end of the orifice stem 404 is nearer to the first opening than to the second opening of the branch lubrication channel 156. Thus, the orifice component 400 may extend across the main lubrication channel 154 from the first section 156a of the branch lubrication channel 156 to the second section 156b of the branch lubrication channel 156. The branch lubrication channel 156 may narrow in the second section 156b of the branch lubrication channel 156 to define a stop (e.g., a step) for the orifice head 402. For example, the orifice component 400 may be inserted into the branch lubrication channel 156, toward the second of the branch lubrication channel 156, until the orifice head 402 hits the stop, which prevents deeper insertion of the orifice component 400.

The stop may be positioned such that orifice head 402 extends only partially into the second section 156b of the branch lubrication channel 156. For example, the orifice head 402 may extend from the main lubrication channel 154 into the second section 156b of the branch lubrication channel 156. Here, the inlet passageways 406 of the orifice head 402 may be positioned in the main lubrication channel 154 to allow lubrication fluid to be pushed into the orifice head 402 via the main lubrication channel 154. Moreover, the outlet 408a of the outlet orifice 408 may be positioned in the second section 156b of the branch lubrication channel 156, such that lubrication fluid pushed into the orifice head 402 via the main lubrication channel 154 is pushed out through the outlet orifice 408 into the second section 156b of the branch lubrication channel 156. A metal-on-metal interface between the orifice head 402 and the stop in the second section 156b of the branch lubrication channel 156, as well as a seal created in the second section 156b of the branch lubrication channel 156 by the sealing ring 412, may prevent fluid from the main lubrication channel 154 from flowing into the branch lubrication channel 156 and may prevent fluid exiting the outlet orifice 408 from recirculating back into the main lubrication channel 154.

The first end of the branch lubrication channel 156 may be sealed by a plug 158. For example, the plug 158 may be fastened to the branch lubrication channel 156 through a threaded connection at the first end of the branch lubrication channel 156. The plug 158 may include a sealing ring, in a similar manner as described above, to seal the branch lubrication channel 156. The plug 158 may extend into the branch lubrication channel 156. A length of the orifice stem 404 may be such that a distance that separates the plug 158 (e.g., where the plug 158 is nearest the orifice stem 404) and an end of the orifice stem 404 (e.g., about ¼ inches) is less than a distance by which the second end 402b of the orifice head 402 extends into the second section 156b of the branch lubrication channel 156 (e.g., where the stop is located in the second section 156b). In this way, any backing out of the orifice component 400 is restricted by the plug 158 (e.g., in the event of backing out, the orifice stem 404 will contact the plug 158) to ensure that the outlet 408a of the outlet orifice 408 remains in the second section 156b of the branch lubrication channel 156.

As indicated above, FIGS. 6-7 are provided as an example. Other examples may differ from what is described with regard to FIGS. 6-7.

INDUSTRIAL APPLICABILITY

The orifice component 400 described herein may be used with any lubrication system that provides lubrication to moving parts of equipment. For example, the orifice component 400 may be used in a lubrication system of a fluid pump. In particular, the orifice component 400 may be used in a lubrication system of a power end of a fluid pump that supplies lubrication fluid to a bearing assembly for a crankshaft of the power end. Generally, an orifice installed in a lubrication passageway of the power end may be difficult to access once the bearing assembly and the crankshaft are installed in the power end. Accordingly, replacement of the orifice, in the event of lubrication supply issues, may be time consuming and may result in significant downtime of the power end.

The orifice component 400 described herein includes an elongated orifice stem 404 that enables the orifice component 400 to be installed and removed through a nose plate of a power end (e.g., at a front side of the power end). For example, the orifice component 400 can be installed in a lubrication passageway such that an orifice head 402 that supplies lubrication fluid is near a bearing assembly of the power end, while the orifice stem 404 is easily accessible via the nose plate. In this way, the orifice component 400 can be removed from the lubrication passageway through the nose plate without uninstalling the crankshaft and/or bearing assembly from the power end. Accordingly, servicing or replacement of the orifice component 400 can be performed quickly, thereby reducing downtime of the power end.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A power end of a fluid pump, comprising:
   a power end frame having a nose plate;
   a crankshaft and one or more bearings for the crankshaft connected at an interior of the power end frame;
   a lubrication manifold defined in the power end frame,
      the lubrication manifold comprising a main lubrication channel and a branch lubrication channel that branches from the main lubrication channel, and
      the branch lubrication channel having a first end that opens through the nose plate and a second end in fluid communication with the one or more bearings; and
   an orifice component disposed in the branch lubrication channel, the orifice component comprising:
      an orifice head having an outlet orifice and one or more inlet passageways in fluid communication with the outlet orifice; and
      an orifice stem extending from the orifice head toward the first end of the branch lubrication channel.

2. The power end of claim 1, wherein the branch lubrication channel has a first section between the first end of the branch lubrication channel and the main lubrication channel, and a second section between the main lubrication channel and the second end of the branch lubrication channel.

3. The power end of claim 2, wherein the orifice head extends from the main lubrication channel into the second section of the branch lubrication channel.

4. The power end of claim 3, wherein the one or more inlet passageways are positioned in the main lubrication channel.

5. The power end of claim 3, further comprising:
   a plug that seals the first end of the branch lubrication channel,
      wherein a distance that separates the plug and an end of the orifice stem is less than a distance by which the orifice head extends into the second section of the branch lubrication channel.

6. The power end of claim 1, wherein the orifice stem has a solid structure.

7. The power end of claim 1, wherein the orifice stem extends from a first end of the orifice head, the outlet orifice has an outlet at a second end of the orifice head opposite the first end of the orifice head, and the one or more inlet passageways are through a sidewall of the orifice head that extends between the first end and the second end of the orifice head.

8. The power end of claim 1, wherein the branch lubrication channel narrows to define a stop for the orifice head.

9. A lubrication system, comprising:
   a lubrication manifold comprising a main lubrication channel and a branch lubrication channel that branches from the main lubrication channel,
      wherein the branch lubrication channel has a first section between a first end of the branch lubrication channel and the main lubrication channel, and a second section between the main lubrication channel and a second end of the branch lubrication channel; and
   an orifice component disposed in the branch lubrication channel, the orifice component comprising:
      an orifice head having an outlet orifice and one or more inlet passageways in fluid communication with the outlet orifice,
         wherein the one or more inlet passageways are positioned in the main lubrication channel; and
      an orifice stem extending from the orifice head.

10. The lubrication system of claim 9, wherein the orifice component extends across the main lubrication channel from the first section of the branch lubrication channel to the second section of the branch lubrication channel.

11. The lubrication system of claim 9, wherein the one or more inlet passageways intersect the outlet orifice.

12. The lubrication system of claim 9, wherein the branch lubrication channel narrows to define a stop for the orifice head.

13. The lubrication system of claim 9, wherein the orifice stem has a solid structure in which fluid passageways are absent.

14. The lubrication system of claim 9, wherein the orifice head extends from the main lubrication channel into the second section of the branch lubrication channel.

15. The lubrication system of claim 9, wherein the one or more inlet passageways comprise:
   a first inlet passageway extending through the orifice head; and
   a second inlet passageway extending through the orifice head and intersecting the first inlet passageway.

16. A lubrication system, comprising:
   a lubrication manifold comprising a main lubrication channel and a branch lubrication channel that branches from the main lubrication channel,
      wherein the branch lubrication channel has a first section between a first end of the branch lubrication channel and the main lubrication channel, and a second section between the main lubrication channel and a second end of the branch lubrication channel; and
   an orifice component disposed in the branch lubrication channel and extending across the main lubrication channel from the first section of the branch lubrication channel to the second section of the branch lubrication channel, the orifice component comprising:

an orifice head having an outlet orifice and one or more inlet passageways in fluid communication with the outlet orifice; and an orifice stem extending from the orifice head.

17. The lubrication system of claim 16, wherein a length of the orifice stem is at least four times a length of the orifice head.

18. The lubrication system of claim 16, wherein the orifice stem extends from a first end of the orifice head, the outlet orifice has an outlet at a second end of the orifice head opposite the first end of the orifice head, and the one or more inlet passageways are through a sidewall of the orifice head that extends between the first end and the second end of the orifice head.

19. The lubrication system of claim 16, wherein the one or more inlet passageways comprise:

a first inlet passageway extending through the orifice head; and a second inlet passageway extending through the orifice head and intersecting the first inlet passageway.

20. The lubrication system of claim 16, wherein the orifice component further comprises a sealing ring disposed in a circumferential groove in the orifice head.

\* \* \* \* \*